(12) United States Patent
Renouil et al.

(10) Patent No.: US 10,348,757 B2
(45) Date of Patent: Jul. 9, 2019

(54) SYSTEM FOR THE MEASUREMENT AND AUTOMATED ACCUMULATION OF DIVERGING CYBER RISKS, AND CORRESPONDING METHOD THEREOF

(71) Applicant: SWISS REINSURANCE COMPANY LTD., Zurich (CH)

(72) Inventors: Gilles Renouil, Thalwil (CH); Daniel Wesemann, White Plains, NY (US); Christian Schauer, München (DE); Jürg Busenhart, Zürich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 257 days.

(21) Appl. No.: 15/273,903

(22) Filed: Sep. 23, 2016

(65) Prior Publication Data
US 2017/0013011 A1    Jan. 12, 2017

Related U.S. Application Data

(63) Continuation of application No. PCT/EP2014/056099, filed on Mar. 26, 2014.

(51) Int. Cl.
*H04L 29/06* (2006.01)
*G06Q 20/08* (2012.01)
(Continued)

(52) U.S. Cl.
CPC ........ *H04L 63/1433* (2013.01); *G06F 21/552* (2013.01); *G06Q 20/085* (2013.01);
(Continued)

(58) Field of Classification Search
None
See application file for complete search history.

(56) References Cited

U.S. PATENT DOCUMENTS

| | | | |
|---|---|---|---|
| 6,839,850 B1 * | 1/2005 | Campbell | G06F 21/55 709/223 |
| 2001/0027403 A1 * | 10/2001 | Peterson | G06Q 40/08 705/4 |

(Continued)

OTHER PUBLICATIONS

International Search Report dated Nov. 25, 2014 for PCT/EP2014/056099 filed on Mar. 26, 2014.

*Primary Examiner* — William J. Goodchild
(74) *Attorney, Agent, or Firm* — Oblon, McClelland, Maier & Neustadt, L.L.P.

(57) ABSTRACT

Proposed are a system and a method for the automated measurement, accumulation and monitoring of diverging cyber risks, wherein risk components are exposed by electronic means of the risk components to a plurality of cyber risks. An accumulation device is used for the segmentation of the total cyber risk of a risk component by means of parametrizable risk exposure segments, and wherein, in a searchable trigger table, retrievably stored segmentation parameters are associated with corresponding measuring parameters for capturing the risk exposure of a specific risk exposure segment. The system comprises a trigger module that is connected to the risk components by means of capturing devices in order to dynamically defect and capture measuring values for the measuring parameters related to the occurrence of cyber risk events within the data pathway of said electronic means. By means of the accumulation device, the total risk is accumulated, segmentation by segmentation, by sequentially selecting the segmentation parameters from the trigger table and retrieving the associated measuring parameters for each of the segmentation parameters, and then triggering the trigger module based on the retrieved measuring parameters to capture measuring values for the retrieved measuring parameters from the risk components by means of the capturing devices.

15 Claims, 2 Drawing Sheets

(51) Int. Cl.
*G06F 21/55* (2013.01)
*G06Q 40/08* (2012.01)
*G06Q 20/40* (2012.01)

(52) U.S. Cl.
CPC ......... *G06Q 20/4016* (2013.01); *G06Q 40/08* (2013.01); *H04L 63/1425* (2013.01)

(56) References Cited

U.S. PATENT DOCUMENTS

2003/0126049 A1* 7/2003 Nagan .................... G06Q 40/00
705/35
2013/0117812 A1* 5/2013 Ponchel ................ G06F 21/552
726/1

* cited by examiner

SYSTEM FOR THE MEASUREMENT AND AUTOMATED ACCUMULATION OF DIVERGING CYBER RISKS, AND CORRESPONDING METHOD THEREOF

FIELD OF THE INVENTION

The present invention relates to systems for measuring diverging cyber risks associated with risk-exposed components. The components that are exposed to risk comprise and/or are associated with electronic means for the processing of electronic data and/or for executing electronic processing codes, and/or data-processing-related storage devices and execution devices as well as graphic representation devices, wherein the cyber risk is associated with the operation of these electronic means. The total cyber risk of the risk-exposed components comprises risk exposure to a plurality of diverging cyber risks, wherein each of these cyber risks is related to the occurrence of a corresponding cyber risk event.

BACKGROUND OF THE INVENTION

The problems associated with cyber risk are well known from the prior art; currently, an issue that attracts great attention is the search for appropriate technical solutions in order to minimize these risks or to manage these risks by other technical means, such as appropriate resource pooling systems that absorb the technical or natural consequences of the occurrence of a cyber risk event at risk exposure components, e.g. at industrial or technical facilities or other functional units. In both cases, the risk exposure, i.e. the probability of the occurrence of a risk event and the potential impact thereof on the operation of the risk exposure components are important factors.

Cyber risks relate to at least these three fundamental cyber risk classes: (a) damage to own digital assets—which are normally not considered tangible property (e.g., data, software) and/or physical damage to assets incidental to the occurrence of cyber risks; (b) business interruption triggered either by the above and/or by a lack or impairment of external services; (c) liabilities arising from privacy issues, infringement of intellectual property, virus transmission, or any other serious problem that may be passed from first to third parties mainly via the web or other electronic networks or operational environmental interaction possibility of the technical facilities or entities.

Risks falling under category (a) also comprise so-called "cyber security risks." Cyber security risks typically comprise a variety of cyber incidents, including data breaches, network damage, and cyber extortion. Resource pooling systems, such as automated insurance systems, as classified under (c), are also referred to as "cyber liability coverage." Cyber liability coverage refers to insurance coverage for liability that arises from the unauthorized (copyright violation) use of, or unauthorized access to, electronic data or software within your network or business. Cyber liability risk-transfer parameters, i.e. comprised in cyber liability policies, also provide coverage for liability claims due to the spread of a virus or malicious code, computer theft, extortion, or any inadvertent act, mistake, error, or omission committed by your employees in the course of performing their duties. In general, various dedicated resource pooling and risk-transfer systems have been designed for capturing and for ceding risks and mitigating losses due to such cyber incidents. In prior art, the classification of cyber risks is not always clear and standardized. In general, the technical term cyber risk can be used to describe any kind of risk covering direct or consequential losses to companies arising from cyber-related incidents, such as also e.g. business interruptions, destruction of data and property, and harm to reputation.

Insurance system and associated risk-transfer parameters, as e.g. defined by business insurance policies, typically only cover so-called "tangible" assets. Electronic data are not considered tangible assets under a typical policy definition. Therefore, cyber insurance is a comparatively new field of coverage in the risk-transfer technology, as e.g. insurance business, that is aimed at closing this gap. As the number of risks is fast increasing and the networked world is becoming increasingly more complex, the emergence and evolution of cyber liability policies in the near future will probably involve fast changes and variability.

Many of the technical solutions of the prior art rely on assessing, measuring, technically reducing or otherwise managing (e.g. by means of resource pooling and insurance systems) the cyber risks of enterprises and facilities in order to keep up the operational capability of the unit. As an example, US 2008/047016 A1 discloses a system for the quantified assessment of risk in IT architectures and cyber operations. Another prior art document is e.g. US 2012/0011077 A1, which provides for a system that is based on business rules for monitoring and controlling compliance of cyber security and associated risks in a cloud collaboration. WO 2006/065862 A2 discloses a system for a computer-aided risk assessment for business enterprises related to cyber risks and determination of the impact in the event that such a cyber risk event occurs. Finally, US 2010/0169127 A1 discloses a system for managing and ceding the risk of a manufacturer to a resource pooling system, based on their exposure to damage awards in patent litigation.

Some of the most important technical difficulties arise from capturing and assessing the overall risk that is associated with cyber-related incidents, i.e. the automated risk assessment. The capability of arriving at a precise measurement of total cyber risk exposure of a risk-exposed component or facility is fundamental, inter alia, for the technical operation of risk-transfer systems or damage prevention/recovery systems, such as associated automated resource and risk pooling systems or automated insurance systems. The associated problem extends to the fact that the overall risk is typically spread over various single risks and/or associated treaties and, furthermore, diverging concerning occurrences thereof in different areas of industry, geography or lines of business. Correspondingly, it is possible for different fields to be triggered differently by cyber risks: (i) damage to own digital assets—which are normally not considered as tangible property (e.g. data, software) and/or physical damage to assets incidental to the occurrence of cyber risks; (ii) business interruption triggered either by the above and/or by a lack or impairment of external services; (iii) arising out of privacy issues, infringement on intellectual property, virus transmission, or any other serious problem that may be passed from first to third parties mainly via the web. Cyber risks can therefore cause losses and damages, and they can affect the operational capability of an enterprise in terms of all kinds of technical or financial resources and means. Another problem is the fact that, according to the prior art, cyber risks can trigger all kinds of risk transfer modalities of insurance systems (e.g. traditional damage related to fire/explosion caused by cyber attack) without being able to capture the underlying mechanisms thereof, i.e. any capturing of the total cyber risk associated with a working unit. Moreover, while some insurance systems implicitly have embedded therein some cyber risk features, such as, e.g., E&O (Errors & Omissions; E&O insurance systems therein are also known as Professional Liability Insurance (PLI) systems, or Professional Indemnity Insurance (PII) systems, which are dedicated to a form of risk transfer of liability insurance that helps protect professional advice and service providers, which can be individuals and companies, from bearing the full cost of defending against a claim for negligence that may be brought by a client, and against damages awarded in such a civil lawsuit) for IT (Information Technology) companies and media liability, or they can even have mechanisms that are specifically targeted at cyber risks (e.g. Information System Business Interruption (ISBI) that cover or prevent business interruptions following non-material damage, financial loss due to personal or financial information theft, personal injury, libel/slander. These latter two aspects that involve the communication of false information about a person, group, or entity, such as a corporation. Libel is defined as any defamation that can be seen manifested in writing, print, effigy, movie, or sculptured representation, etc. Slander is defined as any defamation that is manifested by the spoken and auditory word, etc. The overall associated cyber risk cannot be captured or weighed by resource pooling systems as envisioned by the prior art providing an appropriate risk transfer.

US 2013/0117812 A1 show a monitoring system for supervising the security of a computer system with various computer components. A supervision device (DS) captures measurement data representative of states of the computer components. A specified unit determines security indicators of different types for each computer components according to its respective functions and predefined security indicators. The indicators relate to the availability, the intrusion, the vulnerability and the compliance to a security policy. However, such a system does not allow distinctively threat analogous risks in different types of cyber-risk exposed components, and thus does not allow for structured capturing and measurements of diverging cyber risks in different components. Further, U.S. Pat. No. 6,839,850 B1 shows an other prior art system disclosing a security indications—and warning system usable in conjunction with an audit agent, wherein the audit agent forwards audit messages captured by a statistical module, which provides a statistical representation of the number of audit events per user, per session and per node. When a predetermined number of audits within a criteria set are triggered, on indicator is generated providing indications of potential security threads. Also the system of disclosed by U.S. Pat. No. 6,839,850 B1 does not allow distinctively threat analogous risks in different types of cyber-risk exposed components, and thus does not allow for structured capturing and measurements of diverging cyber risks in different components by on automated system.

SUMMARY OF THE INVENTION

It is an object of the present invention to provide a system and method for measuring, accumulating and monitoring diverging cyber risks in various areas of industry and fields of technical applications, i.e. different use or application of technical means, as electronic means, processors, data generation, data capturing, data exchange, networks access, data transfer, use of social or otherwise accessible media, physical damage or malfunction of devices etc. Further, it is also an object of the present invention to provide a system and method for risk sharing of cyber risks associated with the operation of risk-exposed facilities by providing a dynamic self-sufficient risk protection modality for the risk exposure components by means of a cyber risk insurance system. The cyber risk insurance system, which is implemented as an automated resource-pooling system, shall be completely or at least partially automated and self-adaptable/self-maintaining by its technical means, and it shall provide the technical risk transfer basis which can be used by service providers in the risk transfer or insurance technology field for the transfer of risks related to any kind of cyber risk. A further object of the present invention envisions providing a way in which to technically capture, manage and automate complex operations of the insurance industry related to cyber risk transfer. Another object of the present invention provides for synchronizing and adjusting such operations based on technical means. In contrast to standard approaches, the resource-pooling system shall be able to devise a reproducible operation with the desired, technically based, repetitious accuracy that relies on technical means, process flow and process control/operation and that is independent of the technical field, region or line of business to which the risk-exposed component relates. Therefore, it is also an object of the present invention to provide a risk and resource-pooling system that is able to cope with complex related diverging cyber risk events.

According to the present invention, these objects are achieved, particularly, by the features of the independent claims. In addition, further advantageous embodiments can be derived from the dependent claims and related descriptions.

According to the present invention, the above-mentioned objects related to the measurement, accumulation and monitoring of diverging cyber risks are achieved, particularly, in that the risk components comprise electronic means for processing electronic data and/or executing electronic processing codes, and/or they have related data-processing storage devices and/or execution devices and/or graphic representation devices, and wherein the risk components are exposed to a plurality of cyber risks by said electronic means, and wherein a cyber risk is related to the probability for the occurrence of a cyber risk event to risk the components; in that the system comprises an accumulation device with a repository unit for segmenting the total cyber risk of a risk component by means of parametrizable risk exposure segments, and wherein the repository unit of the accumulation device comprises a searchable trigger table with retrievably stored segmentation parameters, which are each associated with corresponding measuring parameters for capturing the risk exposure of a specific risk exposure segment by means of said associated measuring parameters; in that the stored segmentation parameters comprise at least first segmentation parameters for segmenting a first risk contribution associated with measurements of operational interruption or service denial related to third party exposure, and second segmentation parameters for segmenting a second risk contribution associated with measurements of a data privacy breach on third party data, e.g. personal or financial, by means of the risk component, and third segmentation parameters for segmenting a third risk contribution associated with measurements of a material damage measuring parameters as a consequence to the failure of the electronic means of the risk component or associated with measurements of a cyber attack, and fourth segmentation parameters for segmenting a fourth risk contribution associated with measurements of a coordinated attack on scopes of intellectual property, e.g. as parametric data, defined for the risk component; in that the system comprises a trigger module, and wherein the trigger module is connected to the risk components by means of capturing devices, as e.g. measuring sensors or data-filtering and capturing means in data pathways, in order to detect and capture measuring values for the measuring parameters related to the occurrence of cyber risk events within the data pathway of said electronic means; and in that the accumulation device accumulates the total risk of a risk component, segmentation unit by segmentation unit, via the trigger module by sequentially selecting the segmentation parameters from the trigger table, retrieving the associated measuring parameters for each of the segmentation parameters, and triggering the trigger module based on the retrieved measuring parameters in order to capture measuring values for the retrieved measuring parameters from the risk components by means of the capturing devices, and wherein the accumulation of the total cyber risk is achieved by means of the accumulation device for diverging cyber risks accumulating over all sequentially selected segmentation parameters of the trigger table. The invention has, inter alia the advantage that it allows for the implementation of an automated system, for a scenario-based cyber-risk determination of risk exposure of a risk-exposed component or, e.g., an overall insurance portfolio by means of the weighted accumulation of the various exposures. The applicable and defined segmentation scheme allows for the use of an appropriate industry segmentation and/or geographic segmentation and/or insurance lines of business (LoB) segmentation. Further, a total or maximum exposure for a possible, connected insurance system can be automatically derived by the system by summing up the different exposures per risk scenario and risk segment over all accumulated contracts/treaty contracts in a portfolio. The present automated cyber risk insurance system has the further advantage that it is capable of responding to all varieties of cyber risks, thereby overcoming the problem that most prior art systems suffer from, which is, namely, that they only allow for the capture or coverage of risks and related losses or damages with regard to tangible property. Technically, these systems are not able to capture data, software and other non-material damages, losses or risks. Therefore, diverging cyber risks associated with financial loss/costs for damage caused by the loss of data can neither be captured nor covered by the prior art systems. The same applies also, e.g., for business interruption coverage regarding non-physical damage. With the inventive system, as specified by the claims, it is possible to parameterize and accumulate the total cyber risk in a controlled and reproducible manner, which is not possible with the prior art systems. The segmentation, i.e. the risk scenarios, can be dynamically adjusted, which allows the system to dynamically adapt its operation and recognition to newly arising risks in the field of cyber risks. In contrast to prior art systems, the present invention has the advantage that it is able to cover the totality of possible cyber risks by means of its segmentation parameters; it is not only triggered in view of only very limited aspects of the totality of occurring cyber risks, or limited scenarios. An example of diverging cyber risks, which typically cannot be captured and measured by a single system as set forth according to the prior art, is, for example, when a virus affecting the steering software of a cooling system occurs, thereby causing overheating and a fire in a turbine case, which would be covered by a fire policy. By way of another example, on the other hand, an error in a program code can trigger a denial of access to a website, thereby causing a third party loss to an IT company, which would be covered by an E&O policy. Prior art systems are not able to capture such diverging cyber risks and accumulate them to form a total affecting cyber risk.

In one embodied variant, the above-mentioned objects for measurement and accumulation of diverging cyber risks are achieved, particularly, in that the electronic means for the processing of electronic data and/or executing of electronic processing codes, and/or data-processing related storage devices and/or execution devices and/or graphic representation devices are provided, and wherein the risk components are exposed to a plurality of cyber risks, and wherein the cyber risks are related to the real-time occurrence of cyber events that can be captured by predefined measuring parameters associated with said electronic means; in that the cyber risk of a risk component is segmented and accumulated by means of an accumulation device with a repository unit, and wherein the repository unit of the accumulation device comprises a searchable trigger table with retrievably stored segmentation parameters, each associated with defined measuring parameters for capturing risk exposure of a specific risk exposure segment by means of said associated measuring parameters; in that the stored segmentation parameters comprise at least first segmentation parameters for segmenting a first exposure value associated with measurements of operational interruption or service denial, second segmentation parameters for segmenting a second exposure value associated with measurements of a data privacy breach on third party data by means of the risk component, third segmentation parameters for segmenting a third exposure value associated with measurements of material damage measuring parameters as a consequence of the operation of the electronic means of the risk component or associated with measurements of a cyber attack, and fourth segmentation parameters for segmenting a fourth exposure value associated with measurements of coordinated attacks on scopes of intellectual property, e.g. as parametric data, defined for the risk component; in that the segmentation parameters are sequentially selected by means of a trigger module from the trigger table, and the associated measuring parameters are retrieved for each of the segmentation parameters; in that the trigger module is connected to the risk components by means of capturing devices, and wherein measuring values for the measuring parameters related to the occurrence of cyber risk events are detected and captured by means of the capturing devices within the data pathway of said electronic means; and in that the accumulation device accumulates the total risk of the risk component by means of the trigger module, and wherein the accumulation device is triggered by the trigger module transmitting captured measuring values by means of the measuring parameters, and wherein the accumulation is achieved by the accumulation device accumulating over all sequentially selected segmentation parameters from the searchable trigger table. This embodied variant has the same advantages as the preceding embodied variant by giving a further adaptation for the interaction between the trigger module and the accumulation device.

In one embodied variant, the accumulated cyber risk and/or the cyber risk related to a specific segmentation are weighted by a weighting unit by means of corresponding weighting factors based on technological field factors of the risk component and/or geographical allocation factors of the risk component. The weighting factors can also be based simply on a intensity factor that is used is a combination of a severity and frequency factor. Thus, the accumulation control framework of the system of four defined cyber scenarios, i.e. segmentations, is achieved, considering a weighted exposure approach, i.e. EML-type. Therefore, this embodied variant has, inter alia, the advantage that it does not exhibit the disadvantages of the pure limit accumulation systems, as known in the prior art, thereby reaching new technical levels precision. Further, redundancies can be easily recognized and eliminated by the structure of the system.

In another embodied variant, the system comprises a signal generation module for generating an output signal that is based on the measured and accumulated total cyber risk of a risk component, and wherein the system comprises an interface module for transmitting the output signal to an automated cyber risk insurance system, and wherein the output signal comprises at least the accumulated cyber risk and an identification of the risk component associated with the accumulated cyber risk. In one embodied variant, the output signal additionally comprises a pooling factor indicating a payment value that is needed for the pooling of the risk of the risk exposure component based on the total accumulated cyber risk. This embodied variant has the advantage of, furthermore, being easily integrated as a steering or controlling device, e.g. in an automated resource pooling system for risk transfer of the risk components, or the like. The steering and controlling capabilities can also be used by transmitting an output signal as steering signaling for the automated insurance portfolio management or as an input to an automated risk portfolio management system. Such a system can react dynamically in response to changing environmental condition and condition parameters, respectively based on the adaptation capability of the system. Therefore, in still another embodied variant, the trigger device further comprises measuring devices that are coupled to the data pathway of said electronic means and devices of the risk components, and wherein upon the occurrence of a cyber risk event, said occurrence is detected automatically by means of the measuring devices and transmitted by means of measuring parameters to the signal generation module, therein generating an appropriate output signal, which indicates the occurrence, and transmitting the output signal to the automated cyber risk insurance system. The advantages of this embodied variant are, inter alia that the system can be used as a fully automated insurance system, controlling and steering also the resource pooling, e.g. financial data transfer to the pooling system, and loss coverage, payment transfer back to a risk expose component in case of occurrence of cyber risk event. The system has the further advantage that it allows for stable operation of such an automated insurance system based on a correctly measured total cyber risk based on the captured measuring and segmentation parameters.

In one embodied variant, the measuring and accumulation system, as described above, is implemented as an integral part of a cyber risk insurance system, and wherein the cyber risk insurance system is based on a resource-pooling system for risk sharing of measured cyber risks of a variable number of risk exposure components by providing a dynamic self-sufficient risk protection for the risk exposure components by means of the resource-pooling system comprising a signaling system according to claim 1 or 2, and wherein the risk exposure components are connected to the resource-pooling system by means of a plurality of payment-receiving modules that are configured for receiving and storing payments from the risk exposure components for the pooling of their risks and resources, and wherein the resource-pooling system comprises an event-driven core engine comprising measuring devices that trigger in a data flow pathway in order to provide risk protection for a specific risk exposure component based on received and stored payments of the risk exposure components; and in that the accumulated total cyber risk of the pooled risk exposure components comprises a first risk contribution of each pooled risk exposure component associated with the risk of measuring operational interruption or service denial, a second risk contribution of each pooled risk exposure component associated with the risk of measuring a data privacy breach on third party data, a third risk contribution of each pooled risk exposure component associated with the risk of measuring material damage as a consequence of a failure of the electronic means or the risk of measuring a cyber attack, and a fourth risk contribution of each pooled risk exposure component associated with the risk of measuring a coordinated attack on scopes of intellectual property, e.g. as parametric data, defined for the risk component; and in that the system comprises an accumulation device with a repository unit for segmenting and accumulating the cyber risk of a risk component by means of parameterized risk exposure segments, and wherein each of the risk contributions correspond to a parameterized risk exposure segment, and wherein the repository unit of the accumulation device comprises a searchable hash table with retrievably stored segmentation parameters, each associated with defined measuring parameters for capturing risk exposure of a specific risk exposure segment by means of said associated measuring parameters, and wherein a cyber risk loss occurs as a consequence of the measurement of measuring parameters associated with the first, second, third or fourth risk contribution; in that the system comprises a trigger device, and wherein the trigger device sequentially selects the segmentation parameters from the searchable table by retrieving the associated measuring parameters for each of the segmentation parameters; in that the system comprises capturing devices connecting the trigger device to the risk components for detecting and capturing measuring values for the measuring parameters related to the occurrence of cyber risk events within the data pathway of said electronic means and devices; in that the accumulation device accumulates the total risk of the risk component by means of the trigger device, and wherein the accumulation device is triggered by the trigger device transmitting captured measuring values by means of the measuring parameters, and wherein the accumulation is achieved by way of accumulating values over all sequentially selected segmentation parameters from the searchable table; in that the payments from the risk exposure components for the pooling of their risks and resources are determined based on the total accumulated cyber risk; in that in case of a triggering of an occurrence of a cyber risk event associated with the first, second, third or fourth segmentation parameter in the data flow pathway of a risk exposure component by means of the measuring devices, a loss that is associated with first, second, third or fourth segmentation parameter is distinctly covered by the resource pooling system by means of a parametric transfer of payments from the resource-pooling system to the risk exposure component. The resource-pooling system can e.g. comprise an assembly module in order to process risk-related component data and to provide the likelihood of said risk exposure for one or a plurality of the pooled risk exposure components based on the risk-related component data, and wherein the receiving and preconditioned storage of payments from risk exposure components for the pooling of their risks is dynamically determinable based on total accumulated cyber risk and/or the likelihood of the risk exposure of the pooled risk exposure components. This embodied variant has the advantage of being integrated as a steering or controlling device e.g. in an automated resource pooling system for risk transfer relative to the risk components. Such a system allows for fully automating the operation of such a resource pooling system, thereby avoiding the problem of operational instability due to a falsely or imprecisely measured total cyber risk associated with one or a plurality of risk components. As an embodiment variant, the system is recalibrated and/or self-adjusted based on measuring of measuring parameters of the occurrence of a cyber risk event, e.g. in comparison of the risk assessment provided by means of the system prior to the occurrence.

In another embodied variant, the number of pooled risk exposure components is dynamically adapted, by means of the resource-pooling system, to a range where non-covariant, occurring risks covered by the resource-pooling system affect only a relatively small proportion of the total pooled risk exposure components at any given time. This variant has, inter alia, the advantage that it helps to improve the operational and financial stability of the system.

In a further embodied variant, the segmentation parameters and/or related measuring parameters are dynamically adapted by means of an operating module based on time-correlated incidence data for cyber risk condition indicating changes in the technical condition or operation of the risk components. This variant has, inter alia, the advantage that improvements in measurements and/or changing environmental, condition and/or boundary parameters can be dynamically captured by the system and dynamically affect the overall operation of the system based on the total risk of the pooled risk exposure components.

In yet another embodied variant, upon each triggering of an occurrence of measuring parameters indicating a cyber risk, a total parametric payment is allocated with this triggering, and wherein the total allocated payment is transferable upon the triggering of the occurrence of the cyber risk. In the embodied variant, the parametric payment can be leveled with regard to a predefined total payment sum that is determined at least based on the risk-related component data, and/or on the likelihood of the risk exposure for one or a plurality of the pooled risk exposure components based on the risk-related component data. The predefined total payments can e.g. be leveled to any appropriate lump sum or any other sum related to the total transferred risk and the amount of the periodic payments of the risk exposure component. This variant has the advantage, inter alia, that the transfer of the payment by the automated system, which depends on the measuring of an occurrence of a cyber risk event, allows for an adapted payment of the total sum that is dependent on the determined impact of cyber risk event on the risk component. In one embodied variant, a periodic payment transfer from the risk exposure components to the resource pooling system via a plurality of payment receiving modules is requested by means of a monitoring module of the resource-pooling system, and wherein the risk transfer or protection for the risk exposure components is interrupted by the monitoring module, when the periodic transfer is no longer detectable by means of the monitoring module. As a variant, the request for periodic payment transfers can be interrupted automatically or waived by means of the monitoring module, when the occurrence of indicators for a cyber risk event is triggered in the data flow pathway of a risk exposure component. These embodied variants have, inter alia, the advantage that the system allows for a further automation of the monitoring operation, especially of its operation with regard to the pooled resources. In addition, an independent verification trigger of the resource pooling system is activated in cases of a triggering of the occurrence of indicators for a cyber risk event in the data flow pathway of a risk exposure component by means of the trigger module, and wherein the independent verification trigger, additionally, is triggering for the occurrence of indicators regarding the concerned cyber risk event in an alternative data flow pathway with independent measuring parameters from the primary data flow pathway in order to verify the occurrence of the cyber risk event at the risk exposure component. As a variant, the transfer of payments is only assigned to the corresponding risk component if the occurrence of the cyber risk event at the risk exposure component is verified by the independent verification trigger. These embodied variants have, inter alia, the advantage that they help improve the operational and financial stability of the system. In addition, the system is rendered less vulnerable relative to fraud and counterfeit.

Finally, in addition to the system, as described above, and the corresponding method, the present invention also relates to a computer program product that includes computer program code means for controlling one or more processors of the control system in such a manner that the control system performs the proposed method; and it relates, in particular, to a computer program product that includes a computer-readable medium containing therein the computer program code means for the processors.

BRIEF DESCRIPTION OF THE DRAWINGS

The present invention will be explained in more detail by way of example in reference to the drawings in which.

DETAILED DESCRIPTION OF THE PREFERRED EMBODIMENTS

Figure 2:
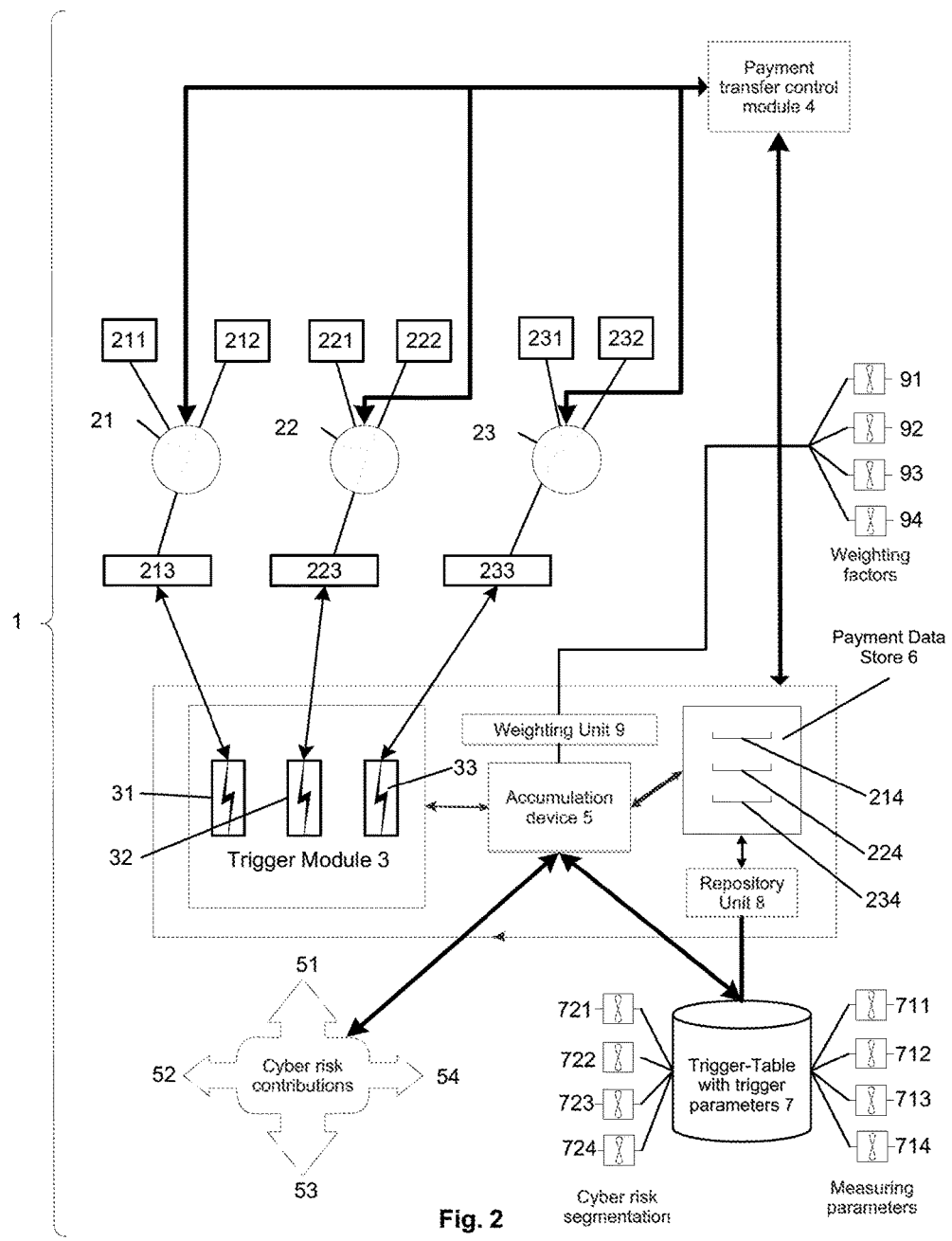
FIG. 2 shows a block diagram illustrating schematically an exemplary system for automated measurement and accumulation of diverging cyber risks, and wherein risk components 21, 22, 23, . . . are exposed by electronic means 213, 223, 233 of the risk components 21, 22, 23, . . . to a plurality of cyber risks 51, 52, 53, 54. An accumulation device 5 is used for segmenting the total cyber risk 50 of a risk component 21, 22, 23, . . . by means of parametrizable risk exposure segments, and wherein, in a searchable trigger table 7, retrievably stored segmentation parameters 721, 722, 723, 724 are associated with corresponding measuring parameters 711, 712, 713, 714 for capturing the risk exposure of a specific risk exposure segment. The system comprises a trigger module 3 which is connected to the risk components 21, 22, 23, . . . by means of capturing devices 31, 32, 33 in order to dynamically detect and capture measuring values for the measuring parameters 711, 712, 713, 714 related to the occurrence of cyber risk events within the data pathway of said electronic means 213, 223, 233. By means of the accumulation device 5, the total risk 50 is accumulated, segmentation by segmentation, by sequentially selecting the segmentation parameters 721, 722, 723, 724 from the trigger table 7 and retrieving the associated measuring parameters 711, 712, 713, 714 for each of the segmentation parameters 721, 722, 723, 724, and triggering the trigger module 3 based on the retrieved measuring parameters in order to capture measuring values for the retrieved measuring parameters 711, 712, 713, 714 from the risk components 21, 22, 23, by means of the capturing devices 31, 32, 33.

FIG. 2 illustrates, schematically, an architecture for a possible implementation of an embodiment of the system for measurement and accumulation of diverging cyber risks, as wet as an architecture for a possible implementation of an embodiment of an automated cyber risk insurance system based on a resource-pooling system 1 for risk sharing of measured cyber risks of a variable number of risk exposure components 21, 22, 23, . . . . Resource-pooling systems 1 are systems for automated pooling of resources from assigned risk exposure components 21, 22, 23, . . . thereby transferring a defined risk associated with the risk exposure components 21, 22, 23, . . . to the resource-pooling systems, wherein the operation of the transferred risk is defined by risk-transfer parameters, as e.g. fixed by means of predefined risk-transfer policies, and wherein in case of triggering the occurrence of the defined risk at a risk exposure component 21, 22, 23, . . . , a loss or operational damage of the concerned risk exposure component 21, 22, 23, . . . is distinctively covered by the resource-pooling system 1 by triggering the specific transfer of resources from the resource-pooling system 1 to the concerned risk exposure component 21, 22, 23, . . . . The operation of the system 1 will be described in detail below. The risk-transfer parameters can e.g. comprise parameters defining physical measuring parameters to detect the occurrence of a risk event at the risk exposure component 21, 22, 23, . . . by means of the system 1 and/or time—or amount related threshold values. The risk exposure components 21, 22, 23, . . . can be any type of operational entity or enterprise, or any unit/person associated with an operational activity etc. The risk components 21, 22, 23, . . . comprise and/or are associated with electronic means 213, 223, 233 for processing electronic data and/or executing electronic processing codes, and/or data-processing related storage devices and/or execution devices and/or graphic representation devices, and wherein the risk components 21, 22, 23, . . . are exposed to a plurality of cyber risks 51, 52, 53, 54 by said electronic means 213, 223, 233 and/or are associated with the operation of said electronic means. In that sense, risk components 21, 22, 23, . . . are understood as functional and/or active entities as port of modern industrial or business environment and/or facilities, where the use of and/or external interaction with electronic data and/or the internet is a part of the operational or business activity, which as a part of the external interaction and operational activity is, however, associated with a range of particular risks, herein called cyber risks, i.e. the specific risks that relate to the bidirectional technical use and interaction of computers, information technology and virtual reality with external networks or electronic devices. A cyber risk is related to the probability for the occurrence of a cyber risk event in relation to risk components 21, 22, 23, . . . . Therefore, cyber risks, as understood in this application, also comprises the risks for secondary damage and/or consequential loss occurring as a consequence of the occurrence of a cyber risk described above. For example, considering a cyber attack could trigger a fire, whereas the risk components 21, 22, 23, also comprise components that are not per se electronic but e.g. steered by electronic means, as e.g. turbine not being itself electronic but cooled by a system that is electronically steered. In other words, also consequential loss or operational damage of a concerned risk exposure component 21, 22, 23, . . . is captured and distinctively covered by the resource-pooling system 1 by means of triggering the specific transfer of resources from the resource-pooling system 1 to the concerned risk exposure component 21, 22, 23, . . . . The system includes at least a processor and associated memory modules. The system 1 can also include one or more display units and operating elements, such as a keyboard, and/or graphic pointing devices, such as a computer mouse. The system is a technical device comprising electronic means that can be used in the field of automated risk transfer or insurance technology with regard to risk transfers that are related to cyber risks. The invention seeks to technically capture, manage and automate complex related operations of monitoring devices and the insurance industry. Another aspect involves synchronizing and adjusting such operations based on technical means. In contrast to standard approaches, the resource-pooling system also achieves reproducible operations and reproducible risk assessment with the desired technical, repetitious accuracy, because it relies completely on technical means, process flow and process control/operation. The system provides a scenario-based, cyber-risk measurement and determination of the risk exposure of risk-exposed components 21, 22, 23, . . . or of an insurance portfolio containing a plurality of risk-exposed components 21, 22, 23, . . . by means of the weighted accumulation of the various exposures. For the accumulation, a defined segmentation scheme is applied using appropriate industry segmentation and/or geographic segmentation and/or insurance lines of business (LoB) segmentation. The total or maximum exposure is derived by summing up the different exposures per risk scenario and risk segment over all accumulated contracts/treaty contracts in a portfolio.

The system comprises an accumulation device 5 with a repository unit 8. The accumulation device 5 segments the total cyber risk 50 of a risk component 21, 22, 23, . . . by means of parametrizable risk exposure segments. The repository unit 8 of the accumulation device 5 comprising a searchable trigger table 7, such as e.g. an appropriately structured hash table, with retrievably stored segmentation parameters 721, 722, 723, 724, each of which is associated with corresponding measuring parameters 711, 712, 713, 714 for capturing the risk exposure of a specific risk exposure segment by means of said associated measuring parameters 711, 712, 713, 714.

The stored segmentation parameters 721, 722, 723, 724 capture four main scenarios of cyber attacks. However, a person skilled in the art understands that further scenarios and segments, respectively, related to cyber risks can easily be incorporated in the inventive system without affecting one of the main concepts of the invention, namely the scenario-based and/or segmentation-based capturing of and/or triggering upon the cyber risk events and related losses. Correspondingly, the segmentation parameters 721, 722, 723, 724 comprise at least first segmentation parameters 721 for segmenting a first risk contribution 51 associated with measurements of operational interruption or service denial. Further comprised are second segmentation parameters 722 for segmenting a second risk contribution 52 associated with measurements of a data privacy breach on third party data by means of the risk component 21, 22, 23, . . . . Also comprised are third segmentation parameters 723 for segmenting a third risk contribution 53 associated with measurements of material damage measuring parameters as a consequence of a failure of the electronic means of the risk component 21, 22, 23, . . . or associated with measurements of a cyber attack. And finally comprised are fourth segmentation parameters 724 for segmenting a fourth risk contribution 54 associated with measurements of a coordinated attack on scopes of intellectual property parametric data defined for the risk component 21, 22, 23, . . . . In other words, for the present inventive system, four different risk scenarios of cyber-related incidents are available; i.e., segments of the total cyber risk are defined, namely, as a first segment 51 or scenario concerning the risk related to denial of service or interruption of operations, second segment 52 concerning the risk related to a data privacy breach with regard to personal or financial data, a third segment 53 concerning the risk related to the material consequence of an IT failure or cyber attack, and a fourth segment 54 concerning the risk related to a coordinated attack on intellectual property. However, these scenarios can also be defined in other ways, or expanded to include additional scenarios, without affecting the fundamental idea underlying the present invention as specified by Exposure($Sc_i$)=ΣExposure(single contracts)+ΣExposure(treaty contracts). The Exposure($Sc_i$) is the exposure for i-th scenario (i=51, 52, 53, 54), i.e. i-th cyber risk segment. The fragmentation of the totality of occurring cyber risk allows for capturing and monitoring all possible kinds of cyber risks and cyber risk transfers, especially referring to any policy covering one or more of the following: (i) damage to own digital assets—which are normally not considered as tangible property (e.g. data, software) and/or physical damage to assets incidental to the occurrence of cyber risks; (ii) business interruption triggered either by the above and/or by a lack or impairment of external services; (iii) liabilities arising out of privacy issues, infringement on intellectual property, virus transmission, or any other serious problems that may be passed from first to third parties mainly via the web. In that sense, it is important to note dependencies and interconnections with regard to other risks related to possible damage or losses to the risk components 21, 22, 23, . . . , since traditional risks for losses can be triggered by cyber risks (e.g. traditional damage related to fire/explosion that is caused by a cyber attack). The present system provides a technical framework for cyber risk accumulation control, thereby allowing for monitoring all possible and future portfolios concerned with cyber risks with respect to cyber coverage granted as part of the existing risk transfers. Further, the system provides a technical framework, which allows for realistic and flexible growth for the purpose of possibly amending boundary conditions in the future. Finally, the inventive system also allows the capturing and monitoring of the real impact of the total cyber risk, rather than trying to empirically adapt the limits of other risk transfer mechanisms without having control over the underlying total cyber risk.

The four accumulation segments or scenarios, as well as any further imaginable cyber risk related segments, as well as appropriate weighting factors, can e.g. be generated based on information that is obtained from filtering historical data. For the filtering on a single risk basis, each industry ("occupancy") can contribute to one or more scenarios with low, medium of high intensity. The intensity factor used is a combination of severity and frequency. On a treaty basis, assumptions can be made based on the lines of business covered, the geographical scope and the type of underlying risk (personal lines, commercial or global). Each line of business can contribute to the scenarios with a multiplication factor that is between 0 (no contribution, e.g. when cyber risk is excluded) to 1 (total contribution, e.g. when the policy explicitly covers cyber risk). Contribution factors between 0 and 1 are also possible, in particular for lines that cover cyber as a secondary scenario (e.g. pure financial loss coverage for a general liability or E&O of a technology company). Exposure information needed for the accumulation is automatically captured by means of the system; therefore, no additional work for the underwriting process, i.e. parameter definition of the risk transfer parameters, is needed. However, periodic monitoring of the historical data can help to dynamically adjust the scenario exposure and control limit consumption. The overall severity and frequency of the scenarios can be determined by calibrating the bottom-up aggregation of the total exposure with top-down market share in an iterative manner. The technical framework also allows for refining the underlying frequency model and the concerned parameters, based on cost monitoring and by extrapolating from occurring claims information.

Figure 1:
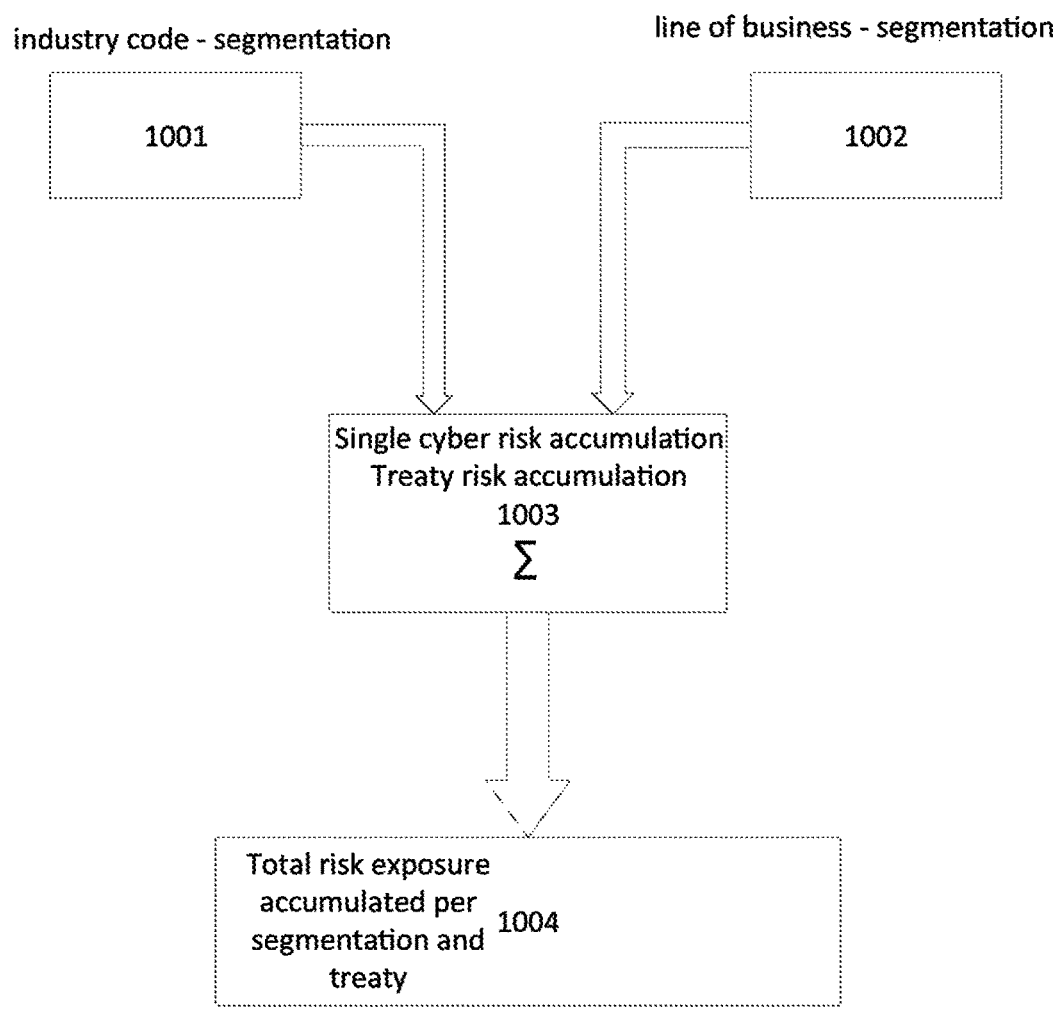
FIG. 1 shows a block diagram illustrating schematically an exemplary cyber risk contribution scheme to the total cyber risk covered by an insurance or reinsurance resource pooling system, and wherein reference number 1001 refers to industry codes versus four segmentation accumulation, reference number 1002 refers to lines of business versus four segmentation accumulation, reference number 1003 to accumulation based on single cyber risk accumulation and/or contract risk accumulation, and reference number 1004 to the total risk exposure accumulated per segmentation and contract.

As described previously, the four main segments, i.e. scenarios, as captured by the monitoring and risk accumulation system are: (i) non-physical damage, denial of service (DOS)/interruption of operations (IO); (ii) non-physical damage, malicious attack on personal (PII)/financial data (FII); (iii) physical damage (STUX); and (iv) non-physical damage by malicious attack on intellectual property (IP). The scenarios allow for independently capturing the related cyber risk, or at least for capturing the same with minimal overlap. The system allows, combined with a minimum amount of information on a risk transfer contract or portfolio, for measuring the impact of a re-/insurance-based risk transfer on one or more scenarios. FIG. 1 illustrates, schematically, the allocation of the total cyber risk, wherein reference number 1001 refers to industry codes versus four segmentation accumulation, reference number 1002 refers to lines of business versus four segmentation accumulation, reference number 1003 refers to accumulation based on single cyber risk accumulation and/or treaty risk accumulation, and reference number 1004 refers to the total risk exposure accumulated per segmentation and treaty.

The system further comprises a trigger module 3. The trigger module 3 is connected to the risk components 21, 22, 23, . . . by means of capturing devices 31, 32, 33 in order to detect and capture measuring values for the measuring parameters 711, 712, 713, 714 related to the occurrence of cyber risk events within the data pathway of said electronic means 213, 223, 233 of the assigned risk exposure components 21, 22, 23, . . . . The data flow pathway 213, 223, 233 can e.g. be monitored by the system, capturing component-related measuring parameters of the data flow pathway 213, 223, 233 at least periodically and/or within predefined time periods. The data flow pathway 213, 223, 233 can, for example, also be dynamically monitored by the resource-pooling system 1, by triggering component-measuring parameters of the data flow pathway 213, 223, 233 transmitted from associated measuring systems. Triggering the data flow pathway 213, 223, 233, which comprises dynamically recorded measuring parameters of the concerned risk exposure components 21, 22, 23, the system 1 is also able to detect the occurrence of a cyber risk event and dynamically monitor the different stages throughout the occurrence of the cyber risk event in order to provide appropriately adapted and gradated risk protection for a specific risk exposure component 21, 22, 23, . . . . Such a risk protection structure can be based on received and stored payments 214, 224, 234 from the related risk exposure component 21, 22, 23, . . . and/or related to the total risk of the resource-pooling system 1 based on the overall transferred cyber risks of all pooled risk exposure components 21, 22, 23, . . . .

The accumulation device 5 accumulates the total risk 50 of a risk component 21, 22, 23, . . . , segmentation by segmentation, by means of the trigger module 3 by sequentially selecting the segmentation parameters 721, 722, 723, 724 from the trigger table 7 and retrieving the associated measuring parameters 711, 712, 713, 714 for each of the segmentation parameters 721, 722, 723, 724. Furthermore, the accumulation device 5 triggers the trigger module 3 based on the retrieved measuring parameters in order to capture measuring values for the retrieved measuring parameters 711, 712, 713, 714 from the risk components 21, 22, 23, . . . by means of the capturing devices 31, 32, 33. The total cyber risk 50 is accumulated by means of the accumulation device 5 for the diverging cyber risks that accumulate over all sequentially selected segmentation parameters 721, 722, 723, 724 of the trigger table 7.

As one embodied variant, the accumulated cyber risk is weighted by a weighting unit 9 by means of corresponding weighting factors 91, 92, 93, 94, thus accounting for technological field conditions and/or geographical allocation conditions of a risk component 21, 22, 23, . . . . Therefore, the accumulation control framework that involves four defined cyber scenarios of the inventive system allows for using a weighted exposure approach (EML-type instead of pure limit accumulation, as in prior art systems). Furthermore, time frame-based periodic monitoring of the exposure development of the defined four cyber scenarios/segments allows for implementing a dynamic adaptation of the overall technical operation of the system. The generation or calibration of the weighting factors can e.g. be achieved by filtering historical data, as described above.

The system can further comprise a signal-generation module for generating an electronic output signal based on the measured and accumulated total cyber risk of a risk component 21, 22, 23, . . . . For transmitting the output signal to an automated cyber risk insurance system, the system can e.g. comprise an interface module. The output signal comprises at least the accumulated cyber risk 50 and an identification of the risk component 21, 22, 23, . . . associated with the accumulated cyber risk. However, the output signal also can comprise a pooling factor indicating a payment value needed for the pooling of the risk of the risk exposure component 21, 22, 23, . . . based on the total accumulated cyber risk 50.

As an embodied variant, the trigger module 3 can comprise measuring devices 31, 32, 33 that are coupled to the data pathway of said electronic means 213, 223, 233 of the risk components 21, 22, 23, . . . . Upon the occurrence of a cyber risk event, the occurrence is automatically detected by means of the measuring devices 31, 32, 33 and transmitted to the signal generation module, thereby generating an appropriate output signal, which indicates the occurrence, and transmitting the output signal to the automated cyber risk insurance system. In that way, the measurement and monitoring system becomes a complete event-driven resource-pooling system for risk sharing in terms of cyber risks associated with the operation of electronic means 213, 223, 233.

As a further embodied variant, the measurement and accumulation system for diverging cyber risks of a single risk exposed component 21, 22, 23 or a portfolio of risk exposed components 21, 22, 23 can be implemented as an integral part of a automated cyber risk event-driven insurance system, i.e. automated resource pooling systems that is triggered by the occurrence of cyber risk events within the boundary conditions of the predefined applicable framework, i.e. the predefined risk transfer framework. Such an automated cyber risk insurance system can be embodied based on a resource-pooling system 1 for risk sharing of measured cyber risks of a variable number of risk exposure components 21, 22, 23, . . . thereby providing dynamic self-sufficient risk protection for the risk exposure components 21, 22, 23, . . . by means of the resource-pooling system 1. Self-sufficient means in the context of this application, that the system 1 is adapting the amount of pooled resources in a way, that the operation of the system 1 can be up-held to cover losses in case of the occurrence of risk events during the defined time-period of risk-transfer, especially it means that the operation of the risk-transfer system 1 can be up-held without human interaction or human adjustment. In this sense, in FIG. 2, reference numeral 1 refers to the resource-pooling system for risk shoring of the risk exposure components 21, 22, 23 . . . . The resource-pooling system 1 provides dynamic self-sufficient risk protection and a corresponding risk protection structure for a variable number of risk exposure components 21, 22, 23, i.e. operational units, enterprises etc., by its means. The system 1 includes at least one processor and associated memory modules. The system 1 can also include one or more display units and operating elements, such as a keyboard, and/or graphic pointing devices, such as a computer mouse. The resource-pooling system 1 is a technical device comprising electronic means that can be used by service providers in the field of risk transfer or insurance technology for risk transfer tasks related to cyber risks. The invention seeks to technically capture, manage and automate complex related operations in the insurance industry. Another aspect provides for synchronizing and adjusting such operations based on technical means in contrast to the standard approaches, the resource-pooling system also achieves reproducible operations with the desired technical, repetitious accuracy, because it relies completely on technical means, process flow and process control/operation. The resource-pooling system 1 can be implemented as a technical platform, which is developed and implemented for providing cyber risk transfer through a plurality of (but at least one) payment receiving modules 4. The risk exposure components 21, 22, 23, etc. are connected to the resource-pooling system 1 by means of the plurality of payment receiving modules 4 that are configured to receive and store payments 214, 224, 234 from the risk exposure components 21, 22, 23, . . . for the pooling of their risks in a payment data store 6. In one variant of the system 1, the number of pooled risk exposure components 21, 22, 23, . . . can e.g. be dynamically adaptable by means of the resource-pooling system 1 within a range where non-covariant, occurring risks covered by the resource-pooling system 1 affect only a relatively small proportion of the totally pooled risk exposure components 21, 22, 23, . . . at any given time. The resource-pooling system comprises an automated measuring, accumulation and monitoring system, as described above. The resource-pooling system 1 comprises an event-driven trigger module 3 comprising capturing devices 31, 32, 33 triggering in a data flow pathway 213, 223, 233 to provide risk protection for a specific risk exposure component 21, 22, 23, . . . based on received and stored payments 214, 224, 234 of the risk exposure components 21, 22, 23, . . . .

The accumulated total cyber risk 50 of the pooled risk exposure components 21, 22, 23, . . . comprises a first risk contribution 51 of each pooled risk exposure component 21, 22, 23, . . . associated with the risk of measuring operational interruption or service denial, a second risk contribution 52 of each pooled risk exposure component 21, 22, 23, . . . associated with the risk of measuring a data privacy breach on third party data, third risk contribution 53 of each pooled risk exposure component 21, 22, 23, . . . associated with the risk of measuring material damage as a consequence of a failure of the electronic means or the risk of measuring a cyber attack, and a fourth risk contribution 54 of each pooled risk exposure component 21, 22, 23, . . . associated with the risk of measuring a coordinated attack on scopes of intellectual property, e.g. as parametric dot, as defined for the risk component 21, 22, 23, . . . .

The automated cyber risk event-driven resource pooling system further comprises an accumulation device 5 with a repository unit 8 for the segmentation and for accumulating the cyber risk 50 of a risk component 21, 22, 23, . . . according to the risk contributions 51, 52, 53, 54 by means of parameterized risk exposure segments. Each of the risk contributions 51, 52, 53, 54 is associated with a parameterized risk exposure segment, and wherein the repository unit 8 of the accumulation device 5 comprises a searchable trigger table 7 with retrievably stored segmentation parameters 721, 722, 723, 724, each of which is associated with defined measuring parameters 711, 712, 713, 714 for capturing the risk exposure of a specific risk exposure segment 51, 52, 53, 54 by means of said associated measuring parameters 711, 712, 713, 714. Accordingly, a cyber risk loss occurs as a consequence of the capturing measuring parameters 711, 712, 713, 714 associated to a first, second, third or fourth risk contribution 51, 52, 53, 54. The stored segmentation parameters 721, 722, 723, 724 and/or associated measuring parameters 711, 712, 713, 714 can e.g. be dynamically adapted by means of a trigger module 3, particularly based on time-correlated incidence data for cyber risk segmentation conditions and/or cyber risk measurement conditions indicating changes in technical measurement devices or applicable cyber risk segmentation 51, 52, 53, 54. The retrievably stored segmentation parameters 721, 722, 723, 724 of the searchable trigger table 7 can e.g. comprise or be based on corresponding predefined or dynamically adapted parameter tables. The parameter tables can e.g. include (i) a table of amount at stake parameters capturing which amount from the risk transfer parameters, as for example defined by policy parameters, has to be taken as basis for a maximum loss calculation (this can be e.g. the loss associated with the total transferred risk i.e. the sum insured, a sub limit, etc. . . . ) by means of the system 1; (ii) table of country parameters giving a grading of regions (e.g. mature market, developing market, emerging market) with a higher factor where legislation and cyber practice makes the third partly exposure higher; (iii) table of industry code parameters capturing facts as e.g. the fact that hospitals and banks factors will be higher for the personal data scenario because they have more sensitive data—as opposed to s y construction companies; (iv) table of intensity parameters reflecting a specific treaty type or loss/risk transfer structure (e.g. so proportional treaties with numerous policies will have a higher factor than non proportional); (v) table of lines of business combination parameters, which is used to identify an amount at stake for treaties that combine several lines e.g. if risk transfer is based upon motor and casualty risk exposure, most premium origin from motor, which is not exposed to cyber risks, therefore the system 1 has to consider this fact; and (vi) table of lines of business factors, wherein e.g. cyber products have a factor of 1 while other incidental coverage have scaling factors applied whether they cover the risk or not (e.g. aviation will have a small impact while accident will have zero because not covered). Therefore, the segmentation parameters 721, 722, 723, 724, respectively the parameters of the parameter tables provide inter alia the means for parameterizing and/or generating the likelihood and for generating the corresponding impact. As an embodiment variant, each parameter is generated by further assigning an appropriate value in a defined range to its assigned area. The assigned value can then be multiplied by a fixed weighting for each parameter. Such on approach enables the system 1 to generate a score for each likelihood and impact parameter. Such generated likelihood and impact scores can then e.g. be added together to generate overall likelihood and impact scores. The likelihood weightings for each parameter, can, if applied, take any appropriate form or values, as e.g. 10 for very significant, 7-9 for significant, 4-6 for moderate, and 1-3 for low. For this embodiment variant, each of the parameters for likelihood is multiplied by the corresponding likelihood weighting which results in an overall score for a likelihood. Further, the parameters capturing impact weightings can e.g. comprise as values 10 for critical, 7-9 for high, 4-6 for moderate and 1-3 for low, or any other appropriate scaling. For this embodiment variant, the impact parameters are multiplied by the corresponding impact weighting resulting an overall impact score. The weightings can e.g. be applied to both the overall likelihood and impact scores to produce a scaled score. This scaled scores can e.g. be used to generate categories of likelihood and impact of a particular area, wherein the categories can e.g. be determined by assigning a range of values to each category. In this way, the system can define weighting categories which correspond to risk classifications and/or parameterized risk exposure segments capturing the risk contributions 51, 52, 53, 54.

The trigger module 3 sequentially selects the segmentation parameters 721, 722, 723, 724 from the searchable trigger table 7 by retrieving the associated measuring parameters 711, 712, 713, 714 for each of the segmentation parameters 721, 722, 723, 724. The capturing devices 31, 32, 33 connect the trigger module 3 to the risk components 21, 22, 23, . . . to detect and capture measuring values for the measuring parameters 711, 712, 713, 714 that are related to the occurrence of cyber risk events within the data pathway of said electronic means 213, 223, 233.

The accumulation device 5 accumulates the total risk 50 of the risk component 21, 22, 23, . . . by means of the trigger module 3, and wherein the accumulation device 5 is triggered by the trigger module 3 transmitting captured measuring values by means of the measuring parameters 711, 712, 713, 714, and wherein the accumulation is achieved by accumulating over all sequentially selected segmentation parameters 721, 722, 723, 724 from the trigger table 7.

The payments 214, 224, 234 from the risk exposure components 21, 22, 23, . . . for the pooling of their risks and resources is determined by means of the accumulation device 5, based on the total accumulated cyber risk 50 of the risk exposure components 21, 22, 23, . . . . As one embodied variant, the accumulation device 5 comprises an assembly module for processing risk-related component data 211, 221, 231 and providing the likelihood 212, 222, 232 of said risk exposure for one or a plurality of the pooled risk exposure components 21, 22, 23, . . . based on the risk-related component data 211, 221, 231, and wherein the receiving and preconditioned storage 6 of payments 214, 224, 234 from risk exposure components 21, 22, 23, . . . for the pooling of their risks can be dynamically determined based on total accumulated cyber risk 50 and/or the likelihood of risk exposure of the pooled risk exposure components 21, 22, 23, . . . . The storage of the payments can be implemented by transferring and storing component-specific payment parameters. The payment amount can be determined dynamically by means of the resource-pooling system 1 based on total cyber risk of the overall pooled risk exposure components 21, 22, 23. For the pooling of the resources, the resource-pooling system 1 can comprise a monitoring module that requests a periodic payment transfer, as e.g. premium parameter transfer, from the risk exposure components 21, 22, 23, etc. to the resource-pooling system 1 by means of the one or more payment transfer control modules 4, and wherein the risk protection for the risk exposure components 21, 22, 23, . . . e.g. can be interrupted by the monitoring module, when the periodic transfer is no longer detectable by the monitoring module. The payment transfer control module 4 can, as an input device, comprise one or more data processing units, displays and other operating elements, such as a keyboard and/or a computer mouse or another pointing device. The receiving operation of the payments with record to the risk exposure components 21, 22, 23 can be monitored based on the stored component-specific payment parameters in the payment data store 6. The different components of the resource-pooling system 1, such as e.g. the payment transfer control module 4 with the trigger module 3 and the accumulation device 5, can be connected via a network for signal transmission. The network can comprise, e.g., a telecommunications network, such as a hard-wired or wireless network, e.g., the internet, a GSM network (Global System for Mobile Communications), an UMTS network (Universal Mobile Telecommunications System) and/or WLAN (Wireless Local Area Network), a Public Switched Telephone Network (PSTN) and/or dedicated point-to-point communication lines. The payment transfer control module 4 and/or trigger module 3 and the accumulation device 5 can also comprise a plurality of interfaces for connecting to the telecommunications network, adhering to the respective transmission standard or protocol. As one embodied variant, the payment transfer control module 4 can also be implemented in the manner of an external device relative to the resource-pooling system 1 providing the risk transfer service via the network for signal transmission, e.g. by a secured data transmission line.

As also illustrated, schematically, in FIG. 2, the monitoring system as well as the resource-pooling system 1 includes a data storing module for capturing the risk-related component data and multiple functional modules; e.g., namely the payment transfer control module 4, the trigger module 3 with the measuring devices 31, 32, 33, e.g. measuring sensors, the accumulation device 5 or the assembly module. The functional modules can be implemented at least partly as programmed software modules and stored on a computer readable medium, connected as fixed or removable to the processor(s) of system 1 or to associated automated systems. One skilled in the art understands, however, that the functional modules can also be implemented fully by means of hardware components, units and/or appropriately implemented modules. As illustrated in FIG. 2, the system can be connected via a network, such as a telecommunications network, to the payment transfer control module 4. The network can include a hard-wired or wireless network; e.g., the Internet, a GSM network (Global System for Mobile Communication), an UMTS network (Universal Mobile Telecommunications System) and/or a WLAN (Wireless Local Region Network), and/or dedicated point-to-point communication lines. In any case, the technical electronic money scheme for the present system comprises adequate technical, organizational and procedural safeguarding means to prevent, contain and detect threats to the security of the scheme, particularly counterfeiting threats. The system comprises, furthermore, of the necessary technical means for electronic money transfer and association, e.g. initiated by one or more associated payment transfer control modules 4 via an electronic network. The monetary parameters can be based on all possible electronic and transferable means, such as e.g. e-currency, e-money, electronic cash, electronic currency, digital money, digital cash, digital currency, or cyber currency, etc., which can only be exchanged electronically. The payment data store 6 provides the means for associating and storing monetary parameters associated with single items of the pooled risk exposure components 21, 22, 23. The present invention can involve the use of any of the mentioned networks, such as e.g. computer networks or telecommunication networks, and/or the Internet and digital stored value systems. Electronic funds transfer (EFT), direct deposit, digital cold currency and virtual currency are further examples of electronic monetary modalities. Also, the transfer can further involve technologies, such as financial cryptography and technologies enabling the same. For the transaction of the monetary parameters, it is preferable for hard electronic currency to be used, particularly without the technical possibility for disputing the same or reversing any charges. The system supports, for example, non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the system 1. This means that the use of hard electronic currency is more akin to a cash transaction. However, also conceivable is the use of soft electronic currency, such as currency that allows for the reversal of payments, for example having a "clearing time" of 72 hours, or the like. The modality of the electronic monetary parameter exchange applies to of connected systems and modules related to the system 1 of the present invention, such as e.g. the payment transfer control module 4. The monetary parameter transfer to the resource-pooling system 1 can be initiated by a payment-transfer control module 4 or upon request by the system 1.

If an occurrence of a cyber risk event is triggered that is associated with the first, second, third or fourth segmentation parameter 71, 72, 73 in the data flow pathway 213, 223, 233 of a risk exposure component 21, 22, 23 by means of the measuring devices 31, 32, 33, a loss associated with first, second, third or fourth segmentation parameter 71, 72, 73 is distinctly covered by the resource pooling system 1, particularly by means of a transfer of payments from the resource-pooling system 1 to the risk exposure component 21, 22, 23, . . . . As embodied variant provides that upon each triggering of an occurrence of measuring parameters indicating a cyber risk 711, 712, 713, 714, a total parametric payment is allocated with the triggering, and wherein the total allocated payment is transferable upon a triggering of the occurrence of a cyber risk event according to the segmentation parameters 721, 722, 723, 724 and captured by the measuring values of the measuring parameters 711, 712, 713, 714.

The invention claimed is:

1. A system for measurement, accumulation, and monitoring of diverging cyber risks, the system comprising:
 a plurality of risk-prone devices, each risk-prone device including a processing circuit configured to process at least one of electronic data, and data related to storage devices and graphic representation devices, each risk-prone device being exposed to a plurality of cyber risks via the corresponding processing circuit, each cyber risk being a probability of occurrence of a cyber risk event in the risk-prone device;

an accumulation device including storage configured to segment a total cyber risk of each of the risk-prone devices into a plurality of risk-exposure segments, the storage including a searchable trigger database including retrievably stored segmentation parameters, each segmentation parameter representing a category of cyber-risk and being associated with a corresponding measuring parameter that captures a risk exposure of the risk exposure segment by defining a physical measuring parameter detected in relation to the risk-prone devices, wherein the stored segmentation parameters include at least a first segmentation parameter for segmenting a first risk contribution associated with measurements of operational interruption and/or service denial, a second segmentation parameter for segmenting a second risk contribution associated with measurements of a data privacy breach on third party data, a third segmentation parameter for segmenting a third risk contribution associated with measurements of material damage as a consequence of a failure of the processing circuit of the risk-prone device or associated with measurements of a cyber-attack, and a fourth segmentation parameter for segmenting a fourth risk contribution that is associated with measurements of coordinated attack on scopes of intellectual property of the risk-prone device; and a triggering device that is connected to each of the risk-prone devices by a corresponding capturing device, the capturing device being configured to detect and capture a measuring value of the measuring parameter related to the occurrence of the cyber risk event within a data pathway of the corresponding processing circuit of the risk-prone device;

wherein, the accumulation device is further configured to accumulate the total risk of each risk-prone device based on the triggering device by sequentially selecting the segmentation parameters from the searchable trigger database and retrieving the associated measuring parameters for each of the segmentation parameters, and trigger the triggering device based on the retrieved measuring parameters to capture measuring values corresponding to the retrieved measuring parameters from the plurality of risk-prone devices via the capturing devices, and compute the total cyber risk based on all sequentially selected segmentation parameters from the searchable trigger database, and the system is further configured to weigh the accumulated cyber risk using weighting factors applied to the segmentation parameters based on at least one of historical data and conditions of the risk-prone devices.

2. The system according to claim 1, wherein the weighting factors are based on accounting technological field conditions and/or geographical allocation conditions of the risk-prone device.

3. The system according to claim 2, further comprising: a signal generation device configured to generate an output signal based on the measured and accumulated total cyber risk of the risk-prone device, and wherein the system comprises an interface for transmitting the output signal to an automated cyber risk insurance system, wherein the output signal includes information corresponding to at least the accumulated cyber risk and an identifier of the risk-prone device associated with the accumulated cyber risk.

4. The system according to claim 3, wherein the output signal further comprises a pooling factor indicating a payment value corresponding to the pooling of the risk of the risk-prone device based on the total accumulated cyber risk.

5. The system according to claim 4, wherein the triggering device further comprises a plurality of measuring devices, each measuring device being coupled to a data pathway of the processing circuit of the corresponding risk-prone device, and wherein, upon the occurrence of a cyber risk event, the occurrence is automatically detected by the measuring device and transmitted to the signal generation device that generates an appropriate output signal that is transmitted to the automated cyber risk insurance system.

6. The system according to claim 3, wherein the automated cyber risk insurance system is a resource-pooling system configured for risk sharing of measured cyber risks of a variable number of risk-prone devices by providing dynamic self-sufficient risk protection based on the accumulation device, and wherein the risk-prone devices are connected to the resource-pooling system by a payment transfer control device that is configured to receive and store payments from the risk-prone devices for the pooling of their risks and resources, and wherein the triggering device triggers the data flow pathway to provide risk protection for a specific risk-prone device based on received and stored payments from the risk-prone device, wherein a cyber risk loss occurs as a consequence of capturing measuring parameters associated with the first, second, third or fourth risk contribution, and wherein the payments from the risk-prone devices for the pooling of risks and resources is determined based on the total accumulated cyber risks of the risk-prone devices, and wherein, an occurrence of triggering the cyber risk event that is associated with the first, second, third or fourth segmentation parameter in the data flow pathway of the risk-prone device by the measuring devices, a loss associated with the first, second, third or fourth segmentation parameter is distinctly covered by the resource pooling system by transferring payments from the resource-pooling system to the risk-prone device.

7. The system according to claim 6, wherein the accumulation device includes an assembly device for processing risk-related component data, and providing a likelihood of the risk exposure for one or a plurality of the pooled risk-prone devices based on the risk-related component data, and wherein the receiving and preconditioned storage of payments from the risk-prone devices for the pooling of risks is dynamically determined based on the total accumulated cyber risk and/or the likelihood of the risk exposure of the pooled risk-prone devices.

8. The system according to claim 7, wherein a number of pooled risk-prone devices is dynamically adapted by the resource-pooling system to a range where non-covariant occurring risks covered by the resource-pooling system affect only a substantially small proportion of a totality of pooled risk-prone devices at a given time.

9. The system according claim 8, wherein the stored segmentation parameters and/or the associated measuring parameters are dynamically adapted by the triggering device based on time-correlated incidence data for cyber risk segmentation conditions and/or cyber risk measurement conditions indicating changes in technical measurement devices or a cyber risk segmentation.

10. The system according to claim 9, wherein upon triggering of an occurrence with regard to measuring parameters indicating a cyber risk, a total parametric payment is allocated with the triggering, and wherein the total allocated payment is transferable when the occurrence of a cyber risk according to the segmentation parameters and captured measuring values of the measuring parameters is triggered.

11. A method for measurement, accumulation, and monitoring of diverging cyber risks in a plurality of risk-prone devices, each risk prone device including a processing circuit configured to process at least one of electronic data, and data related to storage devices and graphic representation devices, each risk prone device being exposed to a plurality of cyber risks via the corresponding processing circuit, each cyber risk corresponding to a probability of occurrence of a cyber risk event in the risk component, the method comprising:

segmenting, by an accumulation device including storage, a total cyber risk of each of the risk-prone devices into a plurality of risk-exposure segments, the storage including a searchable trigger database including retrievably stored segmentation parameters, each segmentation parameter representing a category of cyber-risk and being associated with a corresponding measuring parameter that captures a risk exposure of the risk exposure segment by defining a physical measuring parameter detected in relation to the risk-prone devices, wherein the stored segmentation parameters include at least a first segmentation parameter for segmenting a first risk contribution associated with measurements of operational interruption and/or service denial, a second segmentation parameter for segmenting a second risk contribution associated with measurements of a data privacy breach on third party data, a third segmentation parameter for segmenting a third risk contribution associated with measurements of material damage as a consequence of a failure of the processing circuit of the risk-prone device or associated with measurements of a cyber-attack, and a fourth segmentation parameter for segmenting a fourth risk contribution that is associated with measurements of coordinated attack on scopes of intellectual property of the risk-prone device; and detecting and capturing by a triggering device that is connected to each of the risk components via a corresponding capturing device, a measuring value of the measuring parameter related to the occurrence of the cyber risk event within a data pathway of the corresponding processing circuit;

wherein, the accumulation device is further configured to accumulate the total risk of each risk-prone device based on the triggering device by sequentially selecting the segmentation parameters from the searchable trigger database and retrieving the associated measuring parameters for each of the segmentation parameters, and trigger the triggering device based on the retrieved measuring parameters to capture measuring values corresponding to the retrieved measuring parameters from the plurality of risk-prone devices via the capturing devices, and compute the total cyber risk based on all sequentially selected segmentation parameters from the searchable trigger database, and the method further includes weighing the accumulated cyber risk using weighting factors applied to the segmentation parameters based on at least one of historical data and conditions of the risk-prone devices.

12. The method according to claim 11, further comprising:

weighting, the accumulated cyber risk based on accounting technological field conditions and/or geographical allocation conditions of the risk-prone device.

13. The method according to claim 12, further comprising:

generating an output signal based on the measured and accumulated total cyber risk of the risk-prone device; and transmitting the output signal to an automated cyber risk insurance system, wherein the output signal includes information corresponding to at least the accumulated cyber risk and an identifier of the risk-prone device associated with the accumulated cyber risk.

14. The method according to claim 13, wherein the output signal further comprises a pooling factor indicating a payment value corresponding to the pooling of the risk of the risk-prone device based on the total accumulated cyber risk.

15. The method according to claim 11, wherein the triggering device further includes a plurality of measuring devices that are each coupled to a data pathway of the processing circuit of the corresponding risk-prone device, and wherein, upon the occurrence of a cyber risk event, the occurrence is automatically detected by the measuring device and transmitted to the signal generation device that generates an appropriate output signal that is transmitted to the automated cyber risk insurance system.

* * * * *